Figure 1:
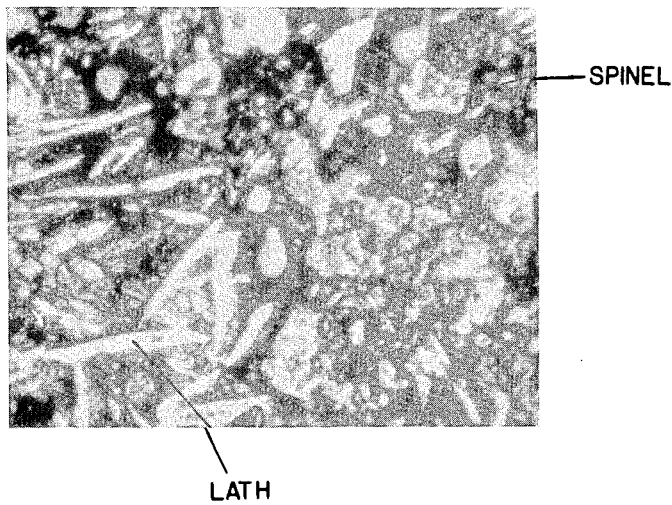

United States Patent [19]

Najjar et al.

[11] Patent Number: 4,876,031

[45] Date of Patent: Oct. 24, 1989

[54] PARTIAL OXIDATION PROCESS

[75] Inventors: Mitri S. Najjar, Hopewell Junction; Roger J. Corbeels, Wappingers Falls, both of N.Y.

[73] Assignee: Texaco Inc., White Plains, N.Y.

[21] Appl. No.: 161,581

[22] Filed: Feb. 29, 1988

Related U.S. Application Data

[63] Continuation-in-part of Ser. No. 51,982, May 19, 1987, Pat. No. 4,826,627.

[51] Int. Cl.$^4$ .............................................. C10J 3/46
[52] U.S. Cl. .................................................... 252/373
[58] Field of Search ........................................ 252/373

[56] References Cited

U.S. PATENT DOCUMENTS

| | | | |
|---|---|---|---|
| 4,657,698 | 4/1987 | Najjar et al. | 252/373 |
| 4,666,464 | 5/1987 | Najjar et al. | 252/373 |
| 4,668,428 | 5/1987 | Najjar | 252/373 |
| 4,668,429 | 5/1987 | Najjar | 252/373 |
| 4,671,804 | 6/1987 | Najjar | 252/373 |
| 4,705,536 | 11/1987 | Becker et al. | 252/373 |
| 4,705,539 | 11/1987 | Najjar et al. | 252/373 |

*Primary Examiner*—Bruce Gray
*Attorney, Agent, or Firm*—Robert A. Kulason; James J. O'Loughlin; Albert Brent

[57] ABSTRACT

Synthesis gas is produced by the partial oxidation of a feedstock comprising petroleum coke and/or heavy liquid hydrocarbonaceous fuel containing sulfur and having an ash that contains nickel, vanadium and a low content of silicon. An iron-containing additive is introduced into the vertical free-flow unobstructed refractory lined reaction zone along with the feed to produce first and second types of liquid phase washing agents which collect and transport at least a portion of the vanadium-containing oxide laths and spinels and other ash components out of the reaction zone. The refractory lining of the reaction zone comprises in wt. %: MgO 85 to 98, $Fe_2O_3$ 0.03 to 3.0, $Al_2O_3$ 0.02 to 2.0, CaO 0.01 to 10, and $SiO_2$ 0.02 to 2.0. Elemental iron may be prevented from forming in the reaction zone by introducing sufficient supplemental oxygen-containing material and/or sulfur-containing material into the reaction zone so as to keep the partial pressure of oxygen and/or $S_2$ gas in the reaction zone slightly above that calculated from Formulae I and/or II. The refractory substantially resists corrosion, erosion, and chemical attack by the molten slag. The life of the refractory is extended. Further, the molten slag is modified by contact with the refractory so that it runs more freely from the gasifier. By this method molten slag having a reduced viscosity and containing the nickel and vanadium-containing impurities from the feedstock and refractory components is readily removed from the gas generator.

33 Claims, 2 Drawing Sheets

SLAG FROM PARTIAL OXIDATION OF LOW
SILICON-CONTAINING PETROLEUM COKE
WITHOUT AN ADDITIVE
(FIELD OF VISION = 0.6MM)

SPINEL

LATH

SLAG FROM PARTIAL OXIDATION OF LOW
SILICON-CONTAINING PETROLEUM COKE WITH
IRON-OXIDE ADDITIVE IN CHROMA-ALUMINA
REFRACTORY LINED GASIFIER
(FIELD OF VISION =1.2MM)

INTERLOCKING LATHS

SLAG FROM PARTIAL OXIDATION OF LOW SILICON-CONTAINING PETROLEUM COKE WITH IRON-OXIDE ADDITIVE IN HIGH MgO REFRACTORY LINED GASIFIER
(FIELD OF VISION =0.55MM)

SPINEL

PARTIAL OXIDATION PROCESS

This is a continuation-in-part of copending application Ser. No. 051,982, filed May 19, 1987.

FIELD OF THE INVENTION

This invention relates to the partial oxidation of ash-containing heavy liquid hydrocarbonaceous fuels, ash-containing petroleum coke, or mixtures thereof to produce gaseous mixtures comprising $H_2+CO$. More particularly it pertains to an additive-refractory combination for removing nickel and vanadium-containing contaminants along with other molten ash components which are produced during the partial oxidation of a low silicon-containing heavy liquid hydrocarbonaceous fuel and/or petroleum coke having nickel and vanadium-containing ash to produce synthesis gas, reducing gas, or fuel gas.

The partial oxidation of liquid hydrocarbonaceous fuels such as petroleum products and slurries of solid carbonaceous fuels such as coal and petroleum coke are well known processes. However, troublesome molten slags are produced along with the product gas in the free-flow unobstructed vertical reaction zone of the partial oxidation gas generator. At the high temperatures e.g. about 2100° F. to 3000° F. prevailing the reaction zone, the highly corrosive molten slag attacks the refractory which lines the reaction zone. Lining failures have sometimes occurred within a few hundred hours. A compatible additive-refractory system is required wherein the molten slag is modified by contact with the refractory so that it runs more freely from the gasifier. The refractory lining should resist substantial corrosion, erosion, and chemical attack by the additive modified molten slag. Costly down-times for replacement of the refractory lining would thereby be avoided.

The Texaco partial oxidation gasification process offers an alternative processing route for the coke or the ash-containing heavy liquid hydrocarbonaceous fuel. For example, water slurries of petroleum coke are reacted by partial oxidation in coassigned U.S. Pat. No. 3,607,157. Gasification is often cited as a convenient means of coke disposition. The decision to use gasification as a coke disposal means is generally based on economics. The expected rise in energy costs and the total use of feed crude should shortly bring about a great utilization of petroleum coke feeds to the partial oxidation gas generator.

Previous gasification runs with delayed coke and/or ash-containing heavy liquid hydrocarbonaceous fuel gave rise to some unexpected operating problems. The ash, which normally melts and is discharged from the gasifier as a slag, was not melting completely and being discharged but was building up on the ash in said materials collected on the gasifier walls and formed oxides during shut-down. Upon subsequent exposure of the gasifier walls to air these deposits involving vanadium can catch fire with vanadium converting to the lower melting $V_2O_5$ or metal vanadate states. The strong solvent action of vanadium oxide on the refractory lining contributed to the clogging of the outlet in the bottom of the gasifier. Nickel impurities may under certain conditions form troublesome nickel oxide and nickel sulfide downstream in the system. Fluxing as used in coal operations and in U.S. Pat. Nos. 1,799,885 and 2,644,745 does not provide a solution to applicant's problem involving troublesome vanadium and nickel.

The subject invention is an improvement in the art since it permits long time operation of the partial oxidation gas generator without shut-down due to failure of the refractory lining in the reaction zone that was brought about by the presence of vanadium.

The foreseeable trend for petroleum reserves is that the produced crude will be increasingly heavier and of poorer quality. To compensate for this trend, refiners must employ more "bottom of the barrel" upgrading to provide the desired light products. The current industry workhouse to provide this upgrading is some type of coking operation (either delayed or fluid). A good deal of current refinery expansion includes the installation or expansion of coker units, and thus, coking will be process of general use for some time to come. Since the crudes more contaminants, i.e. sulfur, metals (predominately vanadium, nickel, and iron), and ash and these contaminants are concentrated in the product coke, this coke is of a much poorer quality and is excluded from its normal product applications. Because the crudes are heavier, i.e., contain more coke precursors, more of this poorer quality coke is produced from each barrel of ash-containing heavy liquid hydrocarbonaceous fuel. The manufacture of petroleum coke pellets by a delayed coking process is described in coassigned U.S. Pat. No. 3,673,080. A fluid coking process is described in U.S. Pat. No. 2,709,676.

SUMMARY OF THE INVENTION

This is a process for the production of gaseous mixtures comprising $H_2+CO$ by the partial oxidation of a feedstock comprising a heavy liquid hydrocarbonaceous fuel having a nickel and vanadium-containing ash, or a low silicon-containing petroleum coke having a nickel and vanadium-containing ash, or mixtures thereof. Further, said feedstock includes a minimum of 0.1 wt. % of sulfur and less than about 350 parts per million (ppm) of silicon; such as in the range of about 1.0 parts per million (ppm) to about 350 ppm of silicon; and said ash includes a minimum of 1.0 wt. % of vanadium, such as about 2.0 to 20 wt. % and a minimum of 1.0 wt. % of nickel, such as about 2.0 to 20 wt. %, and a minimum of 1.0 wt. % of nickel, such as about 2.0 to 5.0 wt. %. The process includes the steps of (1) mixing together an iron-containing additive with said feedstock; wherein the weight ratio of iron-containing additive to ash in the reaction zone in (2) is in the range of about 0.1-10.0 to 1.0, and there is at least 2 parts by weight of iron for each part by weight of vanadium; (2) reacting said mixture from (1) at a temperature in the range of 2100° F. to 3000° F. and about 100° F. to 200° F. above the fluid temperature of the slag, and a pressure in the range of about 2 to 250 atmospheres in a free-flow vertical refractory lined partial oxidation reaction zone of a gasifier with a free-oxygen containing gas in the presence of a temperature moderator and in a reducing atmosphere to produce a hot raw effluent gas stream comprising $H_2+CO$ molten slag; wherein said refractory lining comprises in weight percent: MgO 85 to 98, $Fe_2O_3$ 0.03 to 3.0; $Al_2O_3$ 0.02 to 2.0, CaO 0.1 to 10 and $SiO_2$ 0.02 to 2.0; and where in said reaction zone a first portion of said iron-containing additive combines with a least portion of said nickel, iron, and sulfur constituents found in the feedstock and refractory components to produce a first liquid phase washing agent substantially comprising in wt. % iron about 40 to 80; nickel about 0.1 to 5; and sulfur about 10 to 32; and optionally a minor amount of at least one element selected from the group consisting of Al, Ca, V, Si, Ti, Mg, Mn, Na, K, and mixtures thereof, a second portion of said iron-containing additive combines with a least a portion of the silicon, aluminum, calcium, sodium, and/or potassium, and iron constituents found in the feedstock and refractory components to produce a second liquid phase washing agent substantially comprising in wt. % iron about 5 to 40; magnesium about 0.01 to 2.0; aluminum about 5 to 20; silicon about 20 to 50; calcium about 1.0 to 35; and sodium and/or potassium about 0.01 to 5; and wherein the first and second liquid phase washing agents collect and transport at least a portion of the vanadium-containing oxide laths and spinels and other ash and refractory components out of the reaction zone as said molten slag, and said molten slag combines with a portion of said refractory in the iron-containing additives to produce localized vanadium-containing spinels and substantially no interlocking laths; and (3) separating nongaseous materials from said hot raw effluent gas stream.

In one embodiment, a mixture of heavy liquid hydrocarbonaceous fuel containing less than 350 ppm of silicon and having a nickel and vanadium-containing ash and said iron-containing additive is fed to a coker unit to produce petroleum coke with a nickel and vanadium-containing ash, and with said additive being uniformly dispersed throughout. This petroleum coke is then reacted in the partial oxidation gas generator to produce synthesis gas, reducing gas, or fuel gas.

In another embodiment, a small amount of an additional material selected from the group of oxides consisting of manganese, magnesium, and mixtures thereof is introduced into the reaction zone. These additional elements further increase life of the magnesia refractory by forming a spinel before the vanadium interacts with the refractory. Manganese oxide further increases the fluidity of the slag. These additional materials are provided in the total amount of about 1.0 to 10.0 wt % of the iron-containing additive. There is no formation of elemental iron.

DISCLOSURE OF THE INVENTION

The partial oxidation of heavy liquid hydrocarbonaceous fuel and petroleum coke are described respectively in coassigned U.S. Pat. Nos. 4,411,670 and 3,607,156, which are incorporated herein by reference. Further, suitable free-flow refractory lined gas generators and burners that may be used in the production of synthesis gas, reducing gas, or fuel gas from these materials are also described in the aforesaid references. Advantageously, the subject process uses relatively inexpensive feedstocks comprising heavy liquid hydrocarbonaceous fuel and/or petroleum coke feedstocks having nickel and vanadium-containing ashes. Further, said feedstock includes a minimum of 0.1 wt. % of sulfur, such as at least 2 0 wt. % sulfur; and less than about 350 ppm, such as about 1.0 ppm to about 350 ppm of silicon; and said ash includes a minimum 1.0 wt. % of vanadium, such as about 2.0 to 10.0 wt. %; and a minimum of 1.0 wt. % of nickel, such as about 2.0 to 5.0 wt. %.

By definition, the term heavy liquid hydrocarbonaceous material or fuel having a nickel and vanadium-containing ash is a petroleum or coal derived fuel selected from the group consisting of virgin crude, residua from petroleum distillation and cracking, petroleum distillate, reduced crude, whole crude, asphalt, coal tar, coal derived oil, shale oil, tar sand oil, and mixtures thereof.

By definition, the term petroleum coke having a nickel and vanadium-containing ash is a petroleum coke made from ash containing heavy liquid hydrocarbonaceous fuel by conventional coking methods such as by the delayed or fluid coking process, such as described in coassigned U.S. Pat. No. 3,673,080 in incorporated herein by reference.

Closer study of the ashes derived from the partial oxidation, without an additive, of a feedstock comprising heavy liquid hydrocarbonaceous fuels and/or petroleum coke having nickel and vanadium-containing ashes in a magnesia base refractory lined gas generator shows that they are largely composed of oxide and sulfide compounds of vanadium, nickel, iron, along with some normally occurring mineral matter species. Vanadium-containing oxide laths are present and may be selected from the group consisting of V, V+Ca, V+Fe, V+Al, and mixtures thereof. Vanadium-containing spinels are present of the spinel-type aluminate phases and may include any metals selected from the group consisting of V, Fe, Cr, Al, Mg and mixtures thereof. The presence of abundant interlocking needle to lath-like crystals is the cause of the high viscosity of the slag. Advantageously, such interlocking is substantially absent in the slag from the subject process.

The metals present in the ash derived in the subject process provide a system that is significantly different from that occurring in coal. A further factor is that the total ash content of the petroleum coke or heavy liquid hydrocarbonaceous fuel may be only about one-half to 5 weight percent (wt. %), whereas coal typically contains 10–20 wt. % ash. The comparatively low ash concentration in petroleum coke and heavy liquid carbonaceous fuel may be the reason why the ash removal problem is only noticed after prolonged gasifier runs. The chance for effective ash and additive mixing that is necessary to wash the vanadium constituents out of the reaction zone or for effective fluxing is therefore greatly reduced.

It is theorized that in the heavy liquid hydrocarbonaceous material and petroleum coke systems, a good deal of the ash material is liberated as individual molecular species. This is because upon vacuum distillation or coking, the metallic species in the crude, which are generally present as porphyrin type structures (metal atoms, oxides or ions thereof confined in an organic framework), are entrapped within the collapsed carbon matrix.

Problems arise when the heavy metal constituents build-up in the system. In particular, vanadium and nickel are known to accumulate on the walls of the refractory lined reaction zone of the partial oxidation gas generator and not flow smoothly from the gasifier under normal gasifier conditions. During shut down and subsequent exposure of the gasifier walls to air, these deposits involving vanadium can catch fire with the vanadium converting to the lower melting $V_2O_5$ or metal vanadate states. These materials prove to be very corrosive to refractory thereby decreasing the life of the refractory lining of the reaction zone. These problems and others are minimized by the subject process in which the amount of vanadium constituents remaining in the reaction zone are substantially reduced or eliminated. Further, the subject unique magnesia refractory lining the reaction zone withstands attack from the corrosive molten slag.

This invention pertains to the partial oxidation of a low silicon-containing heavy liquid hydrocarbonaceous fuel and/or petroleum coke, and provides an improved combination of iron-containing additive and refractory lining in the material oxidation reaction zone. Further, a means of introducing this addition agent into the system to give maximum effectiveness is provides.

The high magnesium oxide (e.g. greater than 85 wt. % MgO) refractory lining the partial oxidation reaction zone has the following composition in wt. %: MgO 85 to 98, $Fe_2O$ 0.03 to 3.0, $Al_2O_3$ 0.02 to 2.0, CaO 0.01 to 10, and $SiO_2$ 0.02 to 2.0. The price of this magnesia refractory is comparable to alumina rich refractories (e.g. ruby bricks). Further, it is much cheaper than chromomagnesite refractories. A fused cast refractory is preferred. While fused casts are more expensive and less resistant to thermal cracking, they offer reduced tendency for slag penetration.

The iron-containing additive comprises an iron compound, preferably iron oxide. The iron-containing additive may comprise about 30.0 to 100.0 wt. % of an iron compound. In the reaction zone of the partial oxidation gas generator, a first portion e.g. 10 to 99 wt. % of the additive combines with at least a portion, such as substantially all or a large fraction e.g. about 90 to 97 wt. of the nickel and about 30 to 90 wt. %, say about 50 to 70 wt. % of the iron, and sulfur constituents found in the feedstock to produce a first low viscosity liquid phase washing agent or carrier. Minor amounts e.g. less than about 5 wt. % of the amount present in the feedstock, of other elements from the feedstock may be picked up by the first liquid phase washing agent and dissolved therein. Accordingly, a minor amount of at least one extraneous element selected from the group consisting of Al, Ca, V, Si, Ti, Mg, Mn, Na, K, and mixtures thereof may be optionally present in the first liquid phase washing agent. A second portion of the iron-containing additive combines with at least a portion, such as substantially all or a large fraction e.g. about 40 to 100 wt. %, say about 70 to 90 wt. % of the silicon, aluminum, calcium, sodium and/or potassium, and a portion e.g. 5 to 70 wt. %, of the remainder of the iron constituents found in the feedstock to produce a second liquid phase washing agent. Any remaining iron may go to the vanadium-containing spinel phase. Minor amounts e.g. less than about 5 wt. % of the amount present in the feedstocks, of other elements from the feedstock may be picked up by the second liquid phase washing agent and dissolved therein. Accordingly, a minor amount of at least one extraneous element selected from the group consisting of Ni, V, S, Mg, Cr, and mixtures thereof may be present in the second liquid phase washing agent. Advantageously, by the subject process the sulfur content in the gas, and the downstream gas cleaning costs are substantially reduced or possibly eliminated. Further, in one embodiment substantially all of the sulfur in the feedstock is converted into the sulfide of iron and nickel and leaves the reaction zone in the slag.

The relative proportion of first and second liquid phase washing agents present in the reaction zone depends on the temperature prevailing in the reaction zone and the materials present. An elemental analysis of the first liquid phase washing agent substantially comprises in wt. % iron about 40 to 80, such as about 60 to 70; nickel about 0.1 to 5, such as about 1 to 10; and sulfur about 10 to 32, such as about 15 to 30. A minor amount of at least one of the following extraneous elements may be optionally present in the first liquid phase washing agent in the reaction zone in wt. %: vanadium about 0.05 to 5.0, such as about 0.2 to 2.0; silicon about 0.1 to 5.0, such as about 0.3 to 1.0; magnesium about 0.1 to 6.0; and aluminum about 0.01 to 1.0, such as about 0.1 to 0.3. It was unexpectedly found that most of the nickel e.g. 99 wt. % or more goes into the first liquid phase washing agent. Accordingly, in one embodiment to insure the elimination of harmful nickel subsulfide, the amount of the first liquid phase washing agent comprises at least about 5.0 wt. % (basis total amount of first and second washing agents). An elemental analysis of the second washing agent substantially comprises in wt. %: iron about 5 to 40, such as about 10 to 30; magnesium about 0.01 to 2.0; aluminum about 5 to 20, such as about 8 to 12; silicon about 20 to 50, such as about 30 to 40; calcium about 1.0 to 35, such as about 5 to 15; and sodium and/or potassium about 0.01 to 5, such as about 0.5 to 1.0. The extraneous elements which may be present in the second liquid phase washing agent in the reaction zone include in wt. % vanadium about 0.2 to 5.0, such as about 0.5 to 2.0; and sulfur about 0.01 to 1.5, such as about 0.1 to 1.0.

It was unexpectedly found that these liquid phase washing agents have strong wetting capabilities for the magnesia refractory lining and the high temperature non-flowing vanadium-containing oxide laths and spinels in the reaction zone. These washing agents function in a completely different manner than that of a fluxing additive which may be used for example to solubilize slag constituents in coal. For example, these washing agents do not solubilize the troublesome vanadium-containing oxide laths and spinels. Rather, they serve as carriers and wash them out of the reaction zone. These washing agents wash at least a portion, such as from about 60 to 100 wt. %, say about 70 to 90 wt. %, and preferably all of the vanadium-containing contaminants out of the reaction zone of the partial oxidation gas generator. The mixtures of the first and second liquid phase washing agent and vanadium oxide laths and spinels are referred to herein as slag. Combined with the molten slag in the amount of about 1.0 wt. % is a small portion of the magnesia lining from the reaction zone. The vanadium-containing oxide laths and spinels contain (i) substantially all e.g. 80 to 99 wt. % or a large fraction e.g. 85 to 95 wt. % of the vanadium present in the feed; (ii) the remainder of the Fe, Al, Mg, Ti and other minor impurities from the iron-containing additive and/or feedstock; and (iii) refractory components. the vanadium-containing oxide laths and spinels comprise about 1 to 10 wt. %, such as about 1 to 8 wt. % of vanadium oxide.

The first liquid phase washing agent is present in the amount of about 90 to 99.5 wt. %, (basis total weight of first and second washing agents), such as about 92 to 96 wt. %. The second liquid phase washing agent is present in the amount of about 0.5 to 10.0 wt. % such as about 1 to 2 wt. %. The two liquid phase washing agents are substantially immiscible in each other. For example, the solubility of the first liquid phase washing agent in the second liquid phase washing agent is only about 0.05 to 2.0 wt. %. Actually, with the exception of the vanadium-containing laths and spinels, the first liquid phase washing agent does a better job than the second liquid phase washing agent in washing out of the reaction zone the particulate matter entrained in the hot raw effluent gas stream from the reaction zone. In general, the vanadium-bearing spinels tend to concentrate in the second liquid phase washing agent rather than in the first liquid phase washing agent. In some cases when the amount of the second liquid phase washing agent is less than 1.0 wt. %, the vanadium-bearing spinels have been so abundant that they actually constitute a more or less continuous mass with the second liquid phase washing agent. It is apparent that the vanadium-bearing spinels form very early in the crystallization sequence. Further, they have very high melting points and the grains composed of major proportions of them are rigid to very viscous at very high temperatures. The first liquid phase washing agent, in contrast with the second liquid phase washing agent, has a much lower melting point, and a much lower viscosity. However, it also contains very much less of the vanadium-containing spinels. For example, the melting point and viscosity of the first liquid phase washing agent are in the range of about 1900° F. to 2200° F., and about 5 to 120 poises respectively; whereas, the melting point and viscosity of the second liquid phase washing agent are in the range of about 2150° F. to 2475° F., and about 100 to 1200 poises, respectively.

The distribution of iron between the first and second liquid phase washing agents is influenced by the partial pressures of the oxygen and/or $S_2$ gas in the reaction zone. The lower the partial pressure of oxygen and/or $S_2$ gas at given temperature, the more iron is driven into the first liquid phase washing agent in preference to the second liquid phase washing agent. The formation of elemental iron in the reaction zone leads to difficulties with slag removal. In order to prevent elemental iron for forming, the partial pressure in atmospheres of the oxygen and/or $S_2$ gas in the reaction zone of the gasifier at a specific temperature is kept slightly above that calculated by Formulae I and/or II below.

The relationship between temperature in the reaction zone (T° Fahrenheit), and the common logarithm of the equilibrium partial pressure of oxygen log $P_{(O_2)}$ in atmospheres in the reaction zone is shown by Formula I. When the equilibrium partial pressure of oxygen in the reaction zone drops below that calculated in Formula I for the design temperature in the reaction zone, then sufficient supplemental free-oxygen containing gas is introduced into the reaction zone to restore the equilibrium partial pressure of the oxygen in the reaction zone to a value which is slightly above that calculated in Formula I. Additions of supplemental free-oxygen containing gas in excess of that required to do the job are economically unattractive. Further, they will reduce the efficiency of the process and should be avoided.

$$\log P_{(O_2)} = -38.9691 + 0.01744 \text{ T°F.} - 0.0000024 \text{T}^2\text{°F.} \qquad \text{I}$$

wherein: T is a value in the range of about 2100° F. to 3000° F.

For example, when the temperature in the reaction zone is 2100° F., a first value for the equilibrium partial pressure of oxygen in the reaction zone, as determined from Formula I, is $1.18 \times 10^{-13}$ atmospheres. This value for the partial pressure of the oxygen in reaction zone is compared with a second value of the partial pressure of oxygen which is determined by conventional calculations of the reactions going on in the reaction zone of the gasifier. When the second value for the partial pressure of oxygen is less than the value calculated from Formula I then sufficient supplemental free-oxygen containing gas e.g. air, oxygen, oxygen-enriched air is introduced into the reaction zone to bring the partial pressure of oxygen to a value which is slightly above $1.18 \times 10^{-13}$ atmospheres, such as to about $10^{-12}$ atmospheres or above. The term "slightly above" means an increase of about 3%. Over the reaction temperature range of 2100° to 3000° F. and an atomic O/C ratio in the range of about 0.6 to 1.6, the equilibrium partial pressure of oxygen in the reaction zone will increase in the range of about $1.18 \times 10^{-13}$ to $5.64 \times 10^{-9}$ atmospheres.

As previously mentioned, elemental iron may be prevented from forming in the reaction zone of the partial oxidation gas generator by maintaining the partial pressure of $S_2$ gas in the reaction zone above the value calculated from Formula II below for the specified reaction zone temperature. The relationship between the temperature in the reaction zone (T° Farhenheit), and the common logarithm of the equilibrium partial pressure of $S_2$ gas "log $P_{(S_2)}$" in atmospheres is shown in Formula II. When the equilibrium partial pressure of the $S_2$ gas in the reaction zone drops below that calculated in Formula II for the design temperature in the reaction zone, than sufficient supplemental elemental sulfur or a sulfur-containing material is introduced into the reaction zone to bring the equilibrium partial pressure of the $S_2$ gas in the reaction zone to a value which is slightly above that calculated in Formula II. Additions of supplemental elemental sulfur or sulfur-containing materials in excess of that required to do the job are economically unattractive and should be avoided. Further, costly downstream purification steps for the $S_2$ gas may be then avoided.

$$\log P_{(S_2)} = -17.3454 + 0.007857 \text{ T°F.} - 0.0000011 \text{ T}^2\text{°F.} \qquad \text{II}$$

wherein: T is a value in the range of about 2100° F. to 3000° F.

For example, when the temperature in the reaction zone is 2100° F., the equilibrium partial pressure of $S_2$ gas in the reaction zone when calculated from Formula II is $2 \times 10^{-6}$ atmospheres. This value for the partial pressure of $S_2$ gas in the reaction zone is compared with a second value for the partial pressure of $S_2$ gas which is determined by conventional calculations for the reactions going on in the reaction zone of the gasifier. When the second value for the partial pressure of $S_2$ gas is less than the value calculated from Formula II, then sufficient supplemental elemental sulfur or sulfur containing material e.g. metal sulfides, $H_2S$, COS, $SO_2$ are introduced into the reaction zone to restore the equilibrium partial pressure of $S_2$ gas to a value which is slightly above $2 \times 10^{-6}$ atmospheres, such as about $10^{-5}$ atmospheres. The term "slightly above" means an increase of about 3%. Over the reaction temperature range of 2100° to 3000° F., the equilibrium partial pressure of sulfur in the reaction zone will increase in the range of about $2 \times 10^{-6}$ to $2.12 \times 10^{-4}$ atmospheres.

In another embodiment, it was unexpectedly found that other benefits could be achieved by including in the iron-containing additive, an additional material selected from the group of elements consisting of magnesium, manganese, and mixtures thereof. The elements are provided as suitable compounds selected from the groups consisting of oxides, hydroxides, carbonates, bicarbonates, sulfates, nitrates and mixtures thereof. The total amount of said additional materials may be in the range of about 1.0 to 10.0 wt. %, such as about 2.0 to 8.0 wt. % of the iron-containing additive. The addition of the aforesaid supplemental amount of materials saturates the slag with respect to these constituents thereby preventing their dissolution from the refractory. The life of the refractory lining is thereby extended.

A suitable amount of iron-containing additive is introduced into the reaction zone along with the fuel feedstock in order to satisfy the following two ratios: (i) a wt. ratio of iron-containing additive to ash (noncombustible material) in the reaction zone in the range of about 0.1–10.0 to 1.0, such as in the range of about 1–6 to 1; and (ii) at least 2 parts by weight, such as about 10–30, say 20 parts by weight of iron for each part by weight of vanadium.

Advantageously by the subject process, the two washing phases of the molten slag which are produced in the reaction zone have low viscosities, in comparison with prior art high viscosity slag. This facilitates slag removal. Further, at shut-down of the gasifier, the inside surfaces of the top dome and refractory walls of the reaction zone may be provided clean and with substantially no accumulation of vanadium contaminants.

The partial oxidation reaction takes place in a reducing atmosphere under the following conditions: temperature about 2200° F. to 3000° F., such as about 2300° F. to 2600° F.; say about 2725° F. to 2825° F. Further, the temperature in the reaction zone is 100° F. to 200° F. above the fluid temperature of the slag; pressure is about 2 to 250 atmospheres; $H_2O$/fuel weight ratio is in the range of about 0.1 to 5.0, such as about 0.2 to 0.9; and atomic ratio of free oxygen to carbon in the fuel (O/C ratio) is in the range of about 0.6 to 1.6, such as about 0.8 to 1.4.

The composition of the hot, raw effluent gas stream directly leaving the reaction zone of the free-flow partial oxidation gas generator is about as follows, in mole percent: $H_2$ 10 to 70, CO 15 to 57, $CO_2$ 0.1 to 30, $H_2O$ 0.1 to 20, $CH_4$ nil to 60, $H_2S$ nil to 0.5, COS nil to 0.05, $N_2$ nil to 60, and Ar nil to 2.0. Particulate carbon is present in the range of about 0.2 to 20 weight % (basis carbon content in the feed). Ash is present in the range of about 0.5 to 5.0 wt. %, such as about 1.0 to 3.0 wt. % (basis total weight of fuel feed). Depending on the composition after removal of the entrained particulate carbon and ash by quench cooling and/or scrubbing with water and with or without dewatering, the gas stream may be employed as synthesis gas, reducing gas or fuel gas.

Another aspect of this invention is that the iron-containing additive may be selected on the basis of serendipitous catalytic properties during coking in addition to its use in the generation of the washing agent during gasification, as previously described. For example, it may act to produce more and/or a better quality of light products from the coker operation. It may also aid in the gasification reactions either by increasing the reaction rate and thus the throughput capacity of the gasifier or by increasing the conversion of the soot and thus the overall efficiency of the process. Again, however, this invention does not depend on the catalytic properties of the iron-containing additive.

It was unexpectedly found that a preferred iron-containing additive for mixing with the heavy liquid hydrocarbonaceous material containing low silicon and having a nickel and vanadium-containing ash or petroleum coke containing low silicon and having a nickel and vanadium-containing ash is selected from the group consisting of elemental iron; iron compounds including oxides, sulfides, carbonates, cyanides, nitrates; and mixtures thereof. In another embodiment, the iron compound is a water soluble iron salt. In still another embodiment, the iron compound is a ferro or ferri organic compound selected from the group consisting of naphthenates, oxalates, acetates, citrates, benzoates, oleates, tartrates, and mixtures thereof.

In one embodiment of the subject invention the aforesaid mixture of fuel feedstock and the iron-containing additive are introduced into the partial oxidation gasifier. In another embodiment, the iron-containing additive is mixed with the heavy liquid hydrocarbonaceous material containing low silicon and having a nickel and vanadium-containing ash and the mixture is then fed into a conventional coking unit to produce petroleum coke. By this means, the finely ground iron-containing additive may be intimately mixed throughout the petroleum coke product. The preferable particle size of the comminuted iron-containing additive and the comminuted petroleum coke is in the range of ASTM E-11 Standard Sieve Designation about 210 microns to 37 microns, or below. The ingredients of the aforesaid mixtures may be separately ground and then mixed together. Alternatively, the ingredients may be wet or dry ground together. Intimate mixing of the solid materials is thereby achieved, and the particle sizes of each of the solid materials in the mixture may be substantially the same. The dry ground mixture may be mixed with water or a liquid hydrocarbonaceous materials or both to produce a pumpable slurry having a solids content in the range of about 50–65 wt. %. The slurry is &:hen gasified by partial oxidation in the manner previously described. Alternatively, the solid materials may be wet ground with the liquid slurry medium. Alternatively, the mixture of particulate solids may be entrained in a gaseous medium and then introduced into the partial oxidation gas generator. The gaseous transport medium may be selected from the group consisting of steam, $CO_2$, $N_2$ free-oxygen containing gas, recycle synthesis gas, and mixtures thereof.

For example, a mixture comprising a high boiling liquid petroleum containing low silicon e.g. heavy liquid hydrocarbonaceous fuel containing low silicon and having a nickel and vanadium-containing ash and the comminuted iron-containing additive at a temperature in the range of about 650° F. to 930° F. is introduced into a delayed coking zone, for example, by way of line 33, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead and petroleum coke in admixture with iron-containing additive is removed from the bottom of said delayed coking zon.

In one embodiment, a mixture comprising a high boiling liquid petroleum containing low silicon and having a nickel and vanadium-containing ash, and the comminuted iron-containing additive at a temperature in the range of about 550° F. to 750 F. is introduced into a fluidized bed coking zone for example by way of line 31, such as shown and described in U.S. Pat. No. 2,709,676, which is incorporated herein by reference. At a temperature in the range of about 1000° F. to 1200° F. and a pressure in the range of about 10 to 20 psig, uncondensed hydrocarbon effluent vapor and steam are removed overhead and said petroleum coke is removed from the bottom of said coking zone.

In other embodiments, this invention may be applied to other similar petroleum processes that produce a stream suitable for gasification. Any "bottom of the barrel" process that does not upgrade the bottoms or residue stream to extinction must ultimately produce such a stream. These streams, either liquid or normally solid but pumpable at elevated temperatures, will produce the same gasification problems discussed for coke. Thus, the invention of introducing an iron-containing additive as part of the petroleum processing prior to gasification should, depend on the specific process, produce a feedstock that will be free of the gasification problems mentioned above. Most of these processes employ vacuum distillation as a pretreatment. Accordingly, as described above, the iron-containing addition agent may be mixed with the vacuum distillation feed having a nickel and vanadium-containing ash. The additive will then emerge from the distillation column in the bottoms stream. In turn, the bottoms stream is the feed stream for the upgrading process. This incorporation of the iron-containing additive should not adversely affect these processes, and the iron-containing addition agent should ultimately emerge with the vanadium-rich residue stream from each respective process. In all of these processes, this residue stream should be suitable for gasification by partial oxidation.

EXAMPLES

The following examples are offered as a better understanding of the present invention, but the invention is not to be construed as limited thereto.

Synthesis gas is produced in a vertical free-flow unobstructed refractory lined partial oxidation reaction zone, such as that shown and described in coassigned U.S. Pat. No. 3,607,157, which is incorporated herein by reference. The feedstock comprises an atomized aqueous dispersion of petroleum coke having a nickel and vanadium-containing ash. The petroleum feedstock contains about 3.2 wt % of sulfur and less than 350 ppm of silicon. The ash in the petroleum coke comprises about 12.0 wt. % of vanadium, and about 5.0 wt. % of nickel. The petroleum coke also has uniformly dispersed therein an iron-containing additive comprising about 100 wt. % of iron oxide. The wt. ratio of iron-containing additive to ash is about 5 to 1. The weight ratio of iron to vanadium in the reaction zone is about 16 to 1. The solids content of the slurry is about 60 wt. %.

The petroleum coke is reacted with a free-oxygen containing gas e.g. air, oxygen-enriched air, substantially pure oxygen, in the presence of a temperature moderator e.g. $H_2O$, $CO_2$, $N_2$ in the refractory lined partial oxidation reaction zone at an autogenous temperature of about 2450° F. and a pressure of about 6 atmospheres. The olten slag droplets are readily separated from the hot effluent gas stream leaving the reaction zone by gravity or by quenching and/or scrubbing the gas stream with water or other gas scrubbing medium. The ash fusion temperature for the first liquid phase washing agent and associated ash is below 2100° F. The ash fusion temperature for the second liquid phase washing agent and associated ash is below 2250° F. In comparison with tests run with commercially available refractories, including alumina base refractory, the slag generated from the aforesaid gasification shows the least attack on high MgO refractory comprising in wt. %: 92% MgO, 0.3% $Fe_2O_3$, 0.2% $Al_2O_3$, 1% CaO, and 0.2% $SiO_2$.

Figure 2:
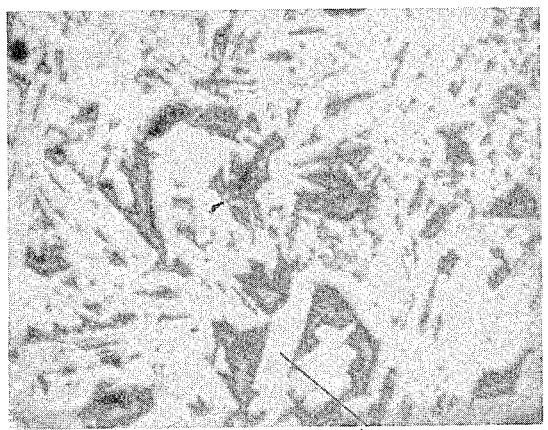
Figure 3:
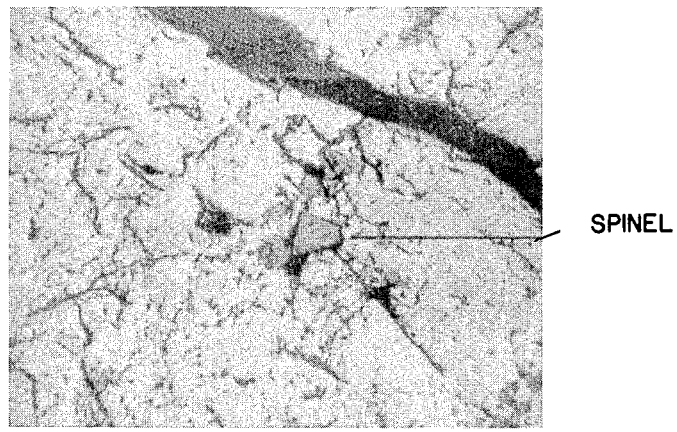

Photomicrographs of cross-sections of typical slags produced from the first and second liquid phase washing agents and illustrating the undissolved vanadium-containing oxide spinels in a matrix of liquid phase washing agents are shown in the drawings for FIGS. 1 to 3.

The following examples are offered to better understand the present invention. Briefly, Example #1 illustrates the problem with removing slag produced by the gasification of low silicon-containing petroleum coke as previously described but without an additive or with an ineffective additive. Example #2 illustrates the potential refractory slag problems that might result from the use of the additive with an unsuitable refractory liner. Example #3 illustrates applicants' invention and shows the success of the additive when used with a compatible hot face high MgO refractory liner.

EXAMPLE #1

Slag produced from partial oxidation of low silicon-containing petroleum coke and without an additive. The drawing for FIG. 1 shows abundant laths comprising the oxides of V, Ca and Fe, with pinels selected from the groups consisting of V, Fe, Ni, Al, and mixtures thereof. The slag is very viscous and there is very little melting, which is necessary to remove the slag from the gasifier. Field of view (F.O.V.)=0.6 mm

EXAMPLE #2

Slag produced from the partial oxidation of low silicon-containing petroleum coke and with an effective calcium moderated iron oxide additive, but with a chromia-alumina refractory. The drawing for FIG. 2 shows interlocking laths of Al, Ca, V-oxide phase in a matrix of Al, Ca, Si, Fe-oxide. The high viscosity of the slag, as evident by the presence of interlocking needles, is a result of the severe interaction of the additive with the alumina based retractory.

EXAMPLE #3

Illustrates applicant' invention. Slag produced from partial oxidation of low silicon-containing petroleum coke and with iron oxide rich additive and the high MgO refractory as previously described. The drawing for FIG. 3 shows the presence of a fluid oxy-sulfide melt with localized spinels rich in Mg, Fe, V. The localized occurrence of the spinels that are formed by the interaction of vanadium and iron with the high MgO refractory (as compared to the interlocking nature of the laths with the alumina rich refractory) will cause no slag removal problems.

Various modifications of the invention as herein before set forth may be made without departing from the spirit and scope thereof, and therefore, only such limitations should be made as are indicated in the appended claims.

We claim:

1. A process for the production of gaseous mixtures comprising $H_2 + CO$ by the partial oxidation of a feedstock comprising a low silicon-containing heavy liquid hydrocarbonaceous fuel having a nickel and vanadium-containing ash, or a low-silicon containing petroleum coke having a nickel and vanadium-containing ash, or mixtures thereof; and said feedstock includes a minimum of 0.1 wt. % of sulfur, and less than about 350 parts per million of silicon; and said ash includes a minimum of 1.0 wt. % vanadium, and a minimum of 1.0 wt. % of nickel; said process comprising:

(1) mixing together an iron-containing additive with said feedstock; wherein the weight ratio of iron-containing additive to ash in the reaction zone in (2) is in the range of about 0.1-10.0 to 1.0, and there is at least 2 parts by weight of iron for each part by weight of vanadium;

(2) reacting said mixture from (1) at a temperature in the range of about 2100° F. to 3000° F. and at a pressure in the range of about 2 to 250 atmosphere in a free-flow vertical refractory lined partial oxidation zone with a free-oxygen containing gas in the presence of a temperature moderator and in a reducing atmosphere to produce a hot raw effluent gas stream comprising $H_2+CO$ and entrained molten slag; wherein said refractory lining comprises in weight percent: MgO 85 to 98, $Fe_2O_3$ 0.03 to 3.0; $Al_2O_3$ 0.02 to 2.0, CaO 0.1 to 10 and $SiO_2$ 0.02 to 2.0; and where in said reaction zone a first portion of the said iron-containing additive combines with at least a portion of the nickel, iron and sulfur constituents found in the feedstock and refractory components to produce a first liquid phase washing agent substantially comprising in wt. % iron about 40 to 80; nickel about 0.1 to 5; and sulfur about 10 to 32; and optionally a minor amount of at least one element selected from the group consisting of Al, Ca, V, Si, Ti, Mg, Mn, Na, K and mixtures thereof; a second portion of said iron-containing additive combines with at least a portion of the silicon, aluminum, calcium, sodium and/or potassium, and iron constituents found in the feedstock and refractory components to produce a second liquid phase washing agent substantially comprising in wt. %: iron about 5 to 40; magnesium about 0.01 to 2.0; aluminum about 5 to 20; silicon about 20 to 50; calcium about 1.0 to 35; and sodium and/or potassium about 0.01 to 5; and wherein the first and second liquid phase washing agents collect and transport at least a portion of the vanadium-containing oxide laths and spinels and other ash and refractory components out of the reaction zone as said molten slag, and said molten slag combines with a portion of said refractory in the amount of about 0.001 to 2.0 wt. % of the weight of said iron-containing additive to produce localized vanadium-containing spinels and substantially no interlocking laths; and (3) separating nongaseous materials from said hot raw effluent gas stream.

2. The process of claim 1 wherein said iron-containing additive is selected from the group consisting of elemental iron; iron compounds selected from the group consisting of oxides, sulfide, sulfate, carbonates, cyanides, nitrates; and mixtures thereof.

3. The process of claim 1 wherein the iron containing portion of said iron-containing additive is a ferro or ferri organic compound selected from the group consisting of nephthenates, oxalates, acetates, citrates, benzoates, oleates, tartrates, and mixtures thereof.

4. The process of claim 1 wherein the iron containing portion of said iron-containing additive is a water soluble iron salt.

5. The process of claim 1 wherein said low silicon-containing heavy liquid hydrocarbonaceous fuel having a nickel and vanadium-containing ash feedstock is selected from the group consisting of virgin crude, residua from petroleum distillation and cracking process operations, petroleum distillate, reduced crude, whole crude, asphalt, coal tar, coal derived oil, shale oil, and mixtures thereof.

6. The process of claim 1 wherein said low silicon-containing heavy liquid hydrocarbonaceous fuel having a nickel and vanadium-containing ash is a pumpable slurry of petroleum coke in a carrier selected from the group consisting of water, liquid hydrocarbon fuel, and mixtures thereof.

7. The process of claim 1 where in (1) said iron-containing additive is introduced into the feed to or the bottoms from a vacuum distillation unit.

8. The process of claim 1 wherein said mixture of iron-containing additive and feedstock from (1) has a particle size of ASTM E-11 Standard Sieve Designation in the range of about 210 microns to 37 microns, or below.

9. The process of claim 1 wherein said iron-containing additive comprises about 30.0 to 100.0 wt. % of an iron compound.

10. The process of claim 1 where in substantially all of the sulfur in said feedstock is converted into the sulfides of iron and nickel and leaves the reaction zone in the slag.

11. The process of claim 1 where included in the iron-containing additive in (1) is an additional material selected from the group of elements consisting of magnesium, manganese, and mixtures thereof.

12. The process of claim 11 wherein said additional materials are provided as compounds in the total amount of about 1.0 to 10.0 wt. % of said additive.

13. The process of claim 12 wherein said compounds are selected from the group consisting of oxides hydroxides, carbonates, bicarbonates, sulfates, nitrates and mixtures thereof.

14. The process of claim 1 wherein the first liquid phase washing agent is present in the amount of about 90 to 99.5 wt. %, (basis total weight of said first and second liquid phase washing agents).

15. The process of claim 1 provided with the step of introducing sufficient supplemental oxygen-containing material and/or sulfur-containing material into the reaction zone so as to maintain at a temperature of 2100° F. said oxygen and/or sulfur in the gaseous phase in the reaction zone at a partial pressure in atmospheres of $1.18 \times 10^{-13}$ and $2 \times 10^{-6}$, respectively.

16. The process of claim 1 wherein said supplemental free oxygen-containing material is selected from the group consisting of substantially pure oxygen, oxygen-enriched air, and air.

17. The process of claim 1 wherein there is present in said first liquid phase washing agent at least one additional element selected from the group consisting of Al, Ca, V, Si, Ti, Mg, Mn, Na, K, and mixtures thereof; and wherein there is present in said second liquid phase washing agent at least one additional element selected from the group consisting of Ni, V, S, Mg, Cr and mixtures thereof.

18. A process for the production of gaseous mixtures comprising $H_2+CO$ by the partial oxidation of a feedstock comprising a low silicon-containing heavy liquid hydrocarbonaceous fuel having a nickel and vanadium-containing ash or petroleum coke having a nickel and vanadium-containing ash, or mixtures thereof; and said feedstock includes a minimum of 0.1 wt. % of sulfur; and less than about 350 part per million of silicon; and said ash includes a minimum of 1.0% vanadium, and a minimum of 1.0 wt. % of nickel, said process comprising:

(1) mixing together an iron-containing additive with said feedstock; wherein the weight ratio of iron-containing additive to ash in the reaction zone in (2) is in the range of about 0.1–10.0 to 1.0, and there is at least 2 parts by weight of iron for each part by weight of vanadium;

(2) coking said mixture from (1) to produce petroleum coke having a nickel and vanadium-containing ash and having dispersed therein said iron-containing additive;

(3) introducing the petroleum coke from (2) into the partial oxidation reaction zone in (4) as a pumpable slurry of petroleum coke in water, liquid hydrocarbonaceous fluid or mixtures thereof, or as substantially dry petroleum coke entrained in a gaseous transport medium;

(4) reacting said mixture form (1) at a temperature in the range of about 2100° F. to 3000° F. and at a pressure in the range of about 2 to 250 atmosphere in a free-flow vertical refractory lined partial oxidation reaction zone with a free-oxygen containing gas in the presence of a temperature moderator and in a reducing atmosphere to produce a hot raw effluent gas stream comprising $H_2+CO$ and entrained molten slag; wherein said refractory lining comprises in weight percent: MgO 85 to 98, $Fe_2O_3$ 0.03 to 3.0; $Al_2O_3$ 0.02 to 2.0, CaO 0.1 to 10 and $SiO_2$ 0.02 to 2.0. and where in said reaction zone a first portion of the said iron-containing additive combines with at least a portion of the nickel, iron and sulfur constituents found in the feedstock to produce a first liquid phase washing agent substantially comprising in wt. % iron about 40 to 80; nickel about 0.1 to 5; and sulfur about 10 to 32; a second portion of said iron-containing additive combines with at least a portion of said silicon, aluminum, calcium, sodium and/or potassium, and iron constituents, found in the feedstock and refractory components to produce a second liquid phase washing agent substantially comprising in wt. %: iron about 5 to 40; magnesium about 0.01 to 2.0; aluminum about 5 to 20; silicon about 20 to 50; calcium about 1.0 to 35; and sodium and/or potassium about 0.01 to 5; and wherein the first and second liquid phase washing agents collect and transport at least a portion of the vanadium-containing oxide laths and spinels and other ash components out of the reaction zone as said molten slag, and said molten slag combines with a portion of said refractory in the amount of about 0.001 to 2.0 wt. % of the weight of said iron-containing additive to produce localized vanadium-containing spinels and substantially no interlocking laths; and (5) separating nongaseous material from said hot raw effluent gas stream.

19. The process of claim 18 wherein said iron-containing additive is selected from the group consisting of elemental iron; iron compounds selected from the group consisting of oxides, sulfides, sulfates, carbonates, cyanides, nitrates; and mixtures thereof.

20. The process of claim 18 wherein said mixture of iron-containing additive and feedstock from (1) has a particle size of ASTME-11 Standard Sieve Designation in the range of about 210 microns to 37 microns or below.

21. The process of claim 18 wherein said iron-containing additive includes an inorganic or organic compound of iron.

22. The process of claim 18 wherein said ash-containing heavy liquid hydrocarbonaceous fuel is a high boiling liquid petroleum feed to or the bottoms from a vacuum tower or a fractionator.

23. The process of claim 18 wherein (2) the mixture from (1) at a temperature in the range of about 650° F. to 930° F. is introduced into a delayed coking zone where at a temperature in the range of about 800° F. to 895° F. and a pressure in the range of about 20 to 60 psig uncondensed hydrocarbon effluent vapor and steam are removed overhead and said petroleum coke having a nickel and vanadium-containing additive is removed from the bottom.

24. The process of claim 18 wherein the first liquid phase washing agent is present in the amount of about 90 to 99.5 wt. % (basis total weight of said first and second liquid phase washing agent).

25. The process of claim 18 wherein (2) the mixture from (1) at a temperature in the range of about 550° F. to 750° F. is introduced into a fluidized bed coking zone where at a temperature in the range of about 1000° F. to 1200° F. and a pressure in the range of about 10 to 20 psig, uncondensed hydrocarbon effluent vapor and steam are removed overhead and said petroleum coke is removed from the bottom.

26. The process of claim 18 where in (5) said nongaseous materials are separated from said hot effluent gas stream by contacting the gas stream from (4) with a water or oil scrubbing medium.

27. The process of claim 18 where included in the iron-containing additive in (1) is an additional material selected from the group of elements consisting of magnesium, manganese, and mixtures thereof in the form of compounds.

28. The process of claim 27 wherein said additional material comprises magnesium which is provided as a compound in the total amount of about 1.0 to 10.0 wt. % of the iron-containing additive.

29. The process of claim 28 wherein said magnesium compound is an oxide.

30. The process of claim 18 wherein substantially all of the sulfur in said feedstock is converted into the sulfides of iron and nickel and leaves the reaction zone in the slag.

31. The process of claim 18 provided with the step of introducing sufficient supplemental oxygen-containing material and/or sulfur-containing material into the reaction zone so as to maintain at a temperature of 2100° F. the oxygen and/or sulfur in the gaseous phase in the reaction zone at a partial pressure in atmospheres of $1.18 \times 10^{-13}$ and $2 \times 10^{-6}$, respectively.

32. The process of claim 18 wherein said supplemental oxygen-containing material is selected from the group consisting of substantially pure oxygen, oxygen-enriched air, and air; and said supplemental sulfur-containing material is selected from the group consisting of elemental sulfur, $H_2S$ COS and $SO_2$.

33. The process of claim 18 wherein there is present in said first liquid phase washing agent at least one additional element selected from the group consisting of Al, Ca, V, Si, Ti, Mg, Mn, Na, K and mixtures thereof; and wherein there is present in said second liquid phase washing agent at least one additional element selected from the group consisting of Ni, V, S, Mg, Cr and mixtures thereof.

* * * * *